United States Patent [19]

Lehment et al.

[11] 4,281,112
[45] Jul. 28, 1981

[54] PROCESS FOR THE PREPARATION OF CATIONIC DYESTUFFS

[75] Inventors: Klaus-Friedrich Lehment, Odenthal; Roderich Raue, Leverkusen; Harald Gleinig, Odenthal-Neschen, all of Fed. Rep. of Germany

[73] Assignee: Bayer Aktiengesellschaft, Leverkusen, Fed. Rep. of Germany

[21] Appl. No.: 169,582

[22] Filed: Jul. 17, 1980

[30] Foreign Application Priority Data

Aug. 4, 1979 [DE] Fed. Rep. of Germany ....... 2931687

[51] Int. Cl.³ .................................. C07D 209/14
[52] U.S. Cl. ................................ 542/417; 542/419
[58] Field of Search .............................. 542/417, 419

[56] References Cited
U.S. PATENT DOCUMENTS

| 3,158,608 | 11/1964 | Raug | 542/417 |
|---|---|---|---|
| 3,741,982 | 6/1973 | Fujino et al. | 542/417 |
| 3,769,279 | 10/1973 | Kuhlthau et al. | 542/417 |
| 3,860,583 | 1/1975 | Schmitt | 542/417 |
| 3,981,869 | 9/1976 | Ziemek | 542/417 |
| 4,026,885 | 5/1977 | Frey | 542/417 |

FOREIGN PATENT DOCUMENTS

| 769000 | 11/1971 | Belgium | 542/417 |
|---|---|---|---|
| 2452321 | 5/1976 | Fed. Rep. of Germany | 542/417 |
| 1232714 | 5/1971 | United Kingdom | 542/417 |
| 1512753 | 6/1978 | United Kingdom | 542/417 |

Primary Examiner—Arthur P. Demers
Attorney, Agent, or Firm—Sprung, Felfe, Horn, Lynch & Kramer

[57] ABSTRACT

The preparation of hydrazone dyestuffs of the formula

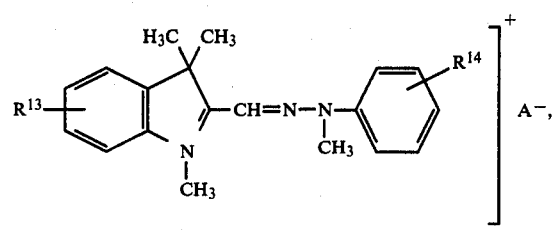

wherein
$R^{13}$ and $R^{14}$ independently of one another represent hydrogen, $C_1$— to $C_4$—alkyl, $C_1$— to $C_4$— alkoxy or halogen, in particular chlorine or bromine, and
$A^-$ denotes an anionic radical,
by reacting azo bases of the general formula

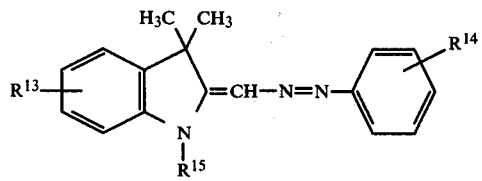

wherein
$R^{13}$ and $R^{14}$ have the above mentioned meaning and $R^{15}$ represents hydrogen or the methyl group, with dimethyl sulphate in a mixture of water and an organic solvent and in the presence of an acid-binding agent, is characterized in that (a) aromatic or aliphatic chlorinated hydrocarbons are used as the organic solvents, (b) the reaction is carried out at a temperature of 10°-60° C., (c) a 5-90% excess of dimethyl sulphate is employed and (d) the reaction is allowed to proceed at a pH of 5-10.

10 Claims, No Drawings

PROCESS FOR THE PREPARATION OF CATIONIC DYESTUFFS

A process for the preparation of cationic dyestuffs of the general formula

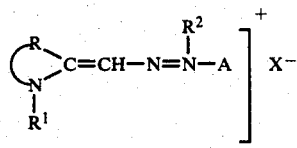

wherein
R denotes the remaining constituent of a 5-membered or 6-membered heterocyclic ring,
$R^1$ denotes an alkyl, cycloalkyl, aralkyl or aryl radical,
$R^2$ denotes an alkyl, cycloalkyl or aralkyl radical,
A denotes an aromatic or heterocyclic radical and
$X^-$ denotes an acid radical,
is known from German Pat. No. 1,083,000.

This process is characterised in that colour bases of the general formula

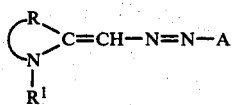

wherein
R, $R^1$ and A have the meaning indicated for formula I,
are reacted with alkylating agents, the azo nitrogen bonded to the radical A being quaternised.

The preparation of dyestuffs of the general formula

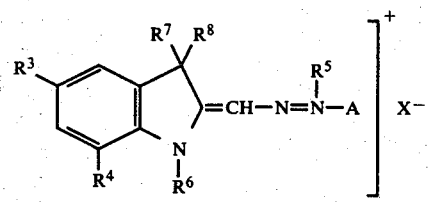

wherein
$A^-$ denotes the radical of an aromatic amine of the benzene or naphthalene series,
X denotes an anion,
$R^7$ and $R^8$ denote short-chain alkyl radicals which are identical or different or bonded to one another,
$R^3$ and $R^4$ denote hydrogen or non-ionic substituents and
$R^5$ and $R^6$ denote alkyl radicals,
in which colour bases of the general formula

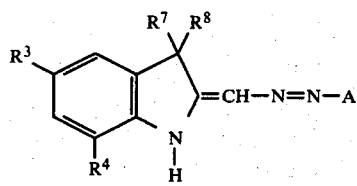

wherein
A, $R^3$, $R^4$, $R^7$ and $R^8$ have the meaning indicated for formula III,
are treated with alkylating agents in the presence of acid-binding agents, is known from German Pat. No. 1,205,638. Both processes use organic solvents as the reaction medium, water essentially being excluded in order to avoid saponification of dimethyl sulphate.

The methylation of these colour bases in the presence of particular tertiary amines is described in German Pat. No. 1,770,782, anhydrous organic solvents being employed in all the examples.

A process for the preparation of cationic hydrazone dyestuffs of the formula

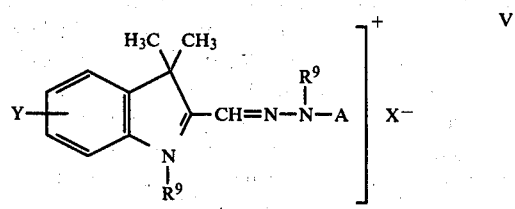

wherein
A is a phenyl radical optionally substituted by non-ionic substituents,
Y is hydrogen, lower alkyl, alkoxy or halogen,
$R^9$ is a lower alkyl radical and
$X^-$ is an anion,
by reacting a colour base of the formula

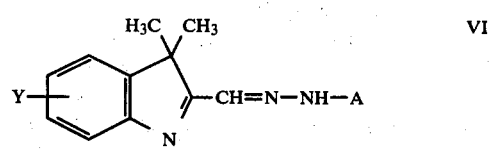

with an alkylating agent $R^9$—X in an aqueous medium in the presence of an acid-binding agent, is known from Japanese Pat. No. 50.20.19.

A process for the preparation of cationic hydrazone dyestuffs of the formula

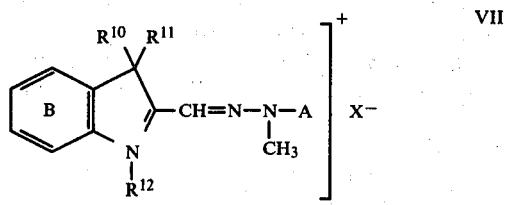

in which
$R^{10}$ and $R^{11}$ denote lower alkyl radicals,
$R^{12}$ denotes a lower alkyl radical, benzyl, β-phenoxyethyl, β-cyanoethyl and β-alkoxyethyl,
A represents an aryl radical, which can carry substituents which do not dissociate, and
$X^-$ represents an anion,
and in which
the ring B can also carry substituents which do noy dissociate,
by reacting an azo base of the formula

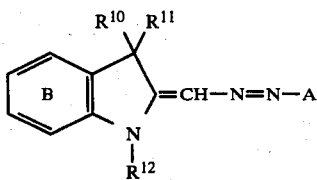

with dimethyl sulphate or methyl halides in the presence of magnesium oxide, is described in Japanese patent application No. 50.17.431.

Because saponification of the alkylating agent simultaneously occurs, both processes lead to end products which are contaminated with colour salts of the starting bases. Such dyestuffs have considerable disadvantages compared with the pure dyestuffs; for example, on polyacrylonitrile materials, they produce duller dyeings with a lower fastness to light and sublimation.

Finally, a process for the preparation of cationic hydrazone dyestuffs by quaternisation of azo bases with dimethyl sulphate in solution and in the presence of an acid-binding agent is known from German Offenlegungsschrift (German Published Specification) No. 2,509,622, the process being characterised by the use of an excess of dimethyl sulphate of 100–300% per mol of precursor, by the use of an aqueous solution containing at least 30% of water as the reaction medium, and by the use of 2.0–3.5 mols of magnesium oxide per mol of precursor. The distinguishing characteristic of this process is an extremely large excess of dimethyl sulphate and a correspondingly large amount of magnesium oxide used as the acid-binding agent. Furthermore, as seen from the description, the process is carried out at temperatures between 70° and 120° C. The text of the patent specification provides for the addition of aromatic co-solvents for azo dyestuff bases with melting points which are considerably higher than 100° C. Benzene, toluene, xylene, o-dichloro-benzene and monochlorobenzene, inter alia, are described as suitable solvents. The saponification products from the excess dimethyl sulphate pollute the effluent, which is why a process in which the excess of dimethyl sulphate can be kept as low as possible is desired.

The invention relates to a process for the preparation of cationic hydrazone dyestuffs of the general formula

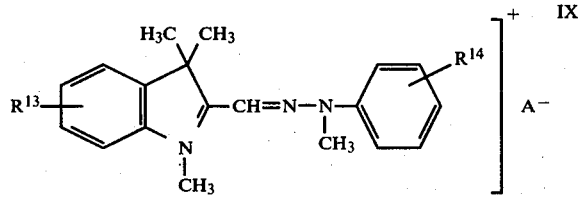

wherein

R$^{13}$ and R$^{14}$ independently of one another represent hydrogen, C$_1$- to C$_4$-alkyl, C$_1$- to C$_4$-alkoxy or halogen, in particular chlorine or bromine, and A$^-$ denotes an anionic radical, by reacting azo bases of the general formula

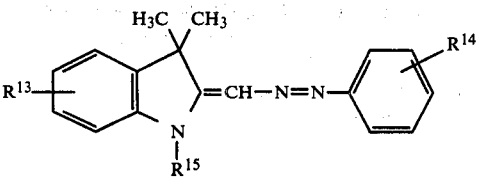

in which

R$^{13}$ and R$^{14}$ have the same meaning as in formula IX and

R$^{15}$ represents hydrogen or the methyl group, with dimethyl sulphate in a mixture of water and an organic solvent and in the presence of an acid-binding agent, characterised in that (a) aromatic or aliphatic chlorinated hydrocarbons are used as the organic solvent, (b) the reaction is carried out at a temperature of 10°–60° C., preferably of 20°–45° C., (c) a 5–90%, preferably 10–75%, excess of dimethyl sulphate is employed and (d) the reaction is allowed to proceed at a pH of 5–10, preferably 6–8.

Suitable starting materials of the formula X are described in German Pat. Nos. 1,083,000 and 1,205,638.

Instead of the colour bases X, it is also possible to use the corresponding colour salts, for example hydrochlorides, sulphates or nitrates. The amount of acid-binding agent should then be chosen such that the colour salt is first converted into the base, since only the colour base is accessible for methylation.

Suitable aliphatic chlorinated hydrocarbons are: methylene chloride, chloroform, 1,2-dichloro-ethane and 1,2-dichloro-propane; amongst these solvents, 1,2-dichloro-propane is particularly preferred.

Suitable aromatic chlorinated hydrocarbons are: chlorobenzene, o-dichloro-benzene, chlorotoluenes and dichlorotoluenes; amongst these solvents, chlorobenzene is particularly preferred. The chlorinated hydrocarbons are used in a weight ratio of 2:1 to 0.3:1, relative to the dyestuff bases employed.

Suitable acid-binding agents are: magnesium oxide, magnesium carbonate, sodium bicarbonate, lithium hydroxide, potassium bicarbonate and zinc oxide. Sodium hydroxide, sodium carbonate, potassium hydroxide and potassium carbonate are also suitable acid-binding agents. In the case of these acid-binding agents, it is advantageous to use a metering device, which is controlled by a pH meter.

The methylation has ended when the content of azo base, relative to methylated end product, is less than 0.5%. For working up, the dyestuff can be salted out in the customary manner, after removing the chlorinated hydrocarbon by steam distillation, and isolated; however, it is also possible to evaporate the dyestuff solution to dryness in a vacuum paddle drier or in a spray-drier, with or without removal of the chlorinated hydrocarbon. This process has the advantage that no effluent is obtained.

The aromatic and, in particular, the aliphatic chlorinated hydrocarbons have a high dissolving power with respect to the hydrates of the methosulphate of the cationic hydrazone dyestuffs.

In a particularly suitable process variant, the cationic hydrazone dyestuff is thus separated off in the organic phase and the organic phase is evaporated in vacuo. 1,2-Dichloro-propane is a particularly suitable solvent for this process.

In a preferred process, an azo salt which has been obtained by coupling to 2,3,3-trimethyl-indolenine is employed as the starting compound and the methylation is carried out in 2 stages. After the methylation on the indolenine nitrogen with, in particular, 1.3–1.9 mols of dimethyl sulphate at 20°–60° C. in a water/chlorinated hydrocarbon mixture in a preferred weight ratio of 0.1:1 to 2.0:1, the aqueous phase, which contains virtually only inorganic salts, is separated off. For the 2nd methylation stage, the organic phase which remains and preferably contains 5–15% of water is treated with 1.3–1.9 mols of dimethyl sulphate at 20°–60° C. In this case also, a dyestuff of excellent quality is obtained by evaporating the organic phase. This process using 1,2-dichloro-propane as the solvent is a particularly preferred process variant.

A particularly low excess of dimethyl sulphate is sufficient if the reaction of the azo salts, obtained by coupling to 2,3,3-trimethyl-indolenine, to give the corresponding hydrazone dyestuffs is carried out in the following manner: the azo salt is introduced into a mixture of chlorinated hydrocarbon and water and neutralisation is carried out at 40°–60° C. with the equivalent amount of an alkali metal hydroxide solution or carbonate solution. The conversion of the azo salt, which is sparingly soluble in both media, into the free base thereby proceeds rapidly and quantitatively. The solution of the azo base in the chlorinated hydrocarbon is obtained by separating off the aqueous salt solution. An acid-binding agent is added to this azo base solution and the methylation is then carried out at 35°–60° C. with 2.05 to 2.6 mols, in particular with 2.1 to 2.3 mols, of dimethyl sulphate. After the dimethyl sulphate addition, the water content of the reacting mixture is adjusted to 5–10% and the methylation is brought to completion in the presence of this amount of water. The salts formed by neutralisation of the methylsulphuric acid formed and a slight excess of the acid-binding agent can be removed as an aqueous phase, after adding more water, by phase separation. The hydrazone dyestuff is obtained in excellent quality and yield by evaporation of the reaction mixture or of the organic phase, which has been freed from foreign salts. If 1,2-dichloropropane is used and the acid-binding agent in the methylation is magnesium oxide, this process is also a particularly preferred preparation variant.

The dyestuffs thus prepared are distinguished by an extremely low content of non-methylated azo colour base; it is always less than 0.5%, and in most cases is 0.1–0.2%. Dyestuffs of this purity are particularly suitable for dyeing polyacrylonitrile in brilliant colour shades which are fast to light and are greenish-tinged yellow to golden yellow.

EXAMPLE 1

81.2 g of the precursor which is obtained by coupling diazotised p-anisidine to 1,3,3-trimethyl-2-methylene-indoline and converting the coupling product into the colour base and which has a water content of 62%, $\triangleq$30.7 g of dry precursor, are warmed with 40 g of chlorobenzene to 90° C., an emulsion of the reactants being formed. After cooling to 40° C., 22 g of dimethyl sulphate are added dropwise; the temperature falls to 35° C. 22 ml of 10% strength sodium hydroxide solution are added dropwise at 35° C. and at pH 7 in the course of 5 hours with the aid of a dropping funnel, the feed of which is controlled by a pH electrode. Thereafter, virtually no further precursor can be detected in a thin layer chromatogram. The reaction mixture is warmed to 90° C. and the pH value falls to 0.7 to 1 by saponification of the dimethyl sulphate still present. Chlorobenzene is now distilled off with steam, whereupon the dyestuff remains in 200 ml of an aqueous solution. 6 g of sodium chloride are added to the hot solution. On cooling, the dyestuff crystallises out. The mixture is subsequently stirred for some hours, the crystals are filtered off and the press cake is washed with 25 ml of 3% strength sodium chloride solution. After drying in vacuo, 40.5 g of the cationic hydrazone dyestuff which dyes polyacrylonitrile materials in golden yellow shades which are fast to light are obtained.

If colour bases which are obtained by coupling 4-anisidine to 1,3,3,5-tetramethyl-2-methylene-indoline, 5-chloro-1,3,3-trimethyl-2-methylene-indoline, 5-methoxy-1,3,3-trimethyl-2-methylene-indoline or 5-ethoxy-1,3,3-trimethyl-2-methylene-indoline are used instead of the colour base obtained from 4-anisidine and 1,3,3-trimethyl-2-methylene-indoline and the procedure is otherwise the same, valuable cationic hydrazone dyestuffs are likewise obtained.

EXAMPLE 2

74.1 g of the precursor which is obtained by coupling diazotised 4-toluidine to 1,3,3-trimethyl-2-methylene-indoline and converting the coupling product into the azo base and which has a water content of 60.7%, $\triangleq$29.1 g of dry precursor, are warmed with 40 g of chlorobenzene to 90° C. and the resulting suspension is cooled again to 40° C. 20 g of dimethyl sulphate $\triangleq$ 0.159 mol are now added dropwise. 18 ml of 10% strength sodium hydroxide solution are added dropwise at 35° C. and at a pH value of 7 in the course of 5.5 hours with the aid of a dropping funnel, the feed of which is controlled by a pH electrode. After this reaction time, only traces of the starting material can still be detected in a thin layer chromatogram. Chlorobenzene is now distilled off with steam and the hydrazone dyestuff is salted out with 3%, calculated relative to the reaction volume, of sodium chloride, filtered off, washed with 50 ml of 3% strength sodium chloride solution and dried in vacuo. 31.7 g of the cationic hydrazone dyestuff are obtained.

If equimolar amounts of the azo bases obtained from diazotised 4-toluidine and 5-chloro-1,3,3-trimethyl-2-methylene-indoline, 5-methoxy-1,3,3-trimethyl-2-methylene-indoline, 7-methoxy-1,3,3-trimethyl-2-methylene-indoline and 5-chloro-7-methoxy-1,3,3-trimethyl-2-methylene-indoline are used instead of the azo base employed in this example and the procedure is otherwise the same, valuable cationic hydrazone dyestuffs are likewise obtained.

EXAMPLE 3

154 g of the precursor obtained by coupling diazotised 4-anisidine to 1,3,3-trimethyl-2-methylene-indoline and converting the coupling product into the azo base are stirred with 240 g of water and 250 g of 1,2-dichloro-propane at room temperature. 12 g of basic magnesium carbonate are then added and 90 g of dimethyl sulphate are subsequently allowed to run in. After an induction phase of 30–60 minutes at 20°–25° C., the reaction starts and the yellow precursor thereby changes colour to red as a result of the dyestuff gradually being formed. During the subsequent exothermic reaction phase, which lasts about 1 hour, the temperature is kept at 23°–25° C. by careful cooling with water. Since most of the methylated dyestuff dissolves in the organic phase, the reaction mixture becomes mobile. When the exothermic reaction has subsided, the mixture is subsequently stirred at 20°-25° C. for about 15 hours and then heated to 60° C. in the course of 4 hours and subsequently stirred at 60° C. for 1 hour. The remaining dimethyl sulphate is hydrolysed rapidly at 60° C. The content of precursor is now determined by thin layer chromatography, and is less than 0.2%. The pH is 6–6.5. The pH is adjusted to 2-3 by adding 10-15 ml of 30% strength hydrochloric acid and 1,2-dichloro-propane is distilled off with steam. The dyestuff is now salted out with sodium chloride and, after subsequent stirring for several hours, the duestuff suspension is adjusted to pH 5 and the dyestuff is filtered off, washed with 750 ml of 7% sodium chloride solution and dried in vacuo to a residual moisture content of less than 4%. Yield: 186 g of cationic hydrazone dyestuff, precursor content: 0.1%

If the precursor, obtained by coupling diazotized aniline, 4-toluidine or 3-chloro-4-anisidine to 1,3,3-trimethyl-2-methylene-indoline and coverting the coupling product into the colour base, is used instead of the azo base employed in this example and the procedure is otherwise the same, valuable cationic hydrazone dyestuffs are likewise obtained.

EXAMPLE 4

The azo dyestuff obtained by coupling diazotised-panisidine to 2,3,3-trimethyl-indolenine is converted into the colour base with sodium hydroxide solution and the colour base is filtered off. 40.8 g of the moist precursor, ≙29.3 g of dry colour base, are warmed with 40 g of chlorobenzene and 34 g of water to 90° C. for 10 minutes and the mixture is then cooled to 30° C. 40 g (0.32 mol) of dimethyl sulphate are added dropwise at 30° C., whilst cooling slightly. The pH drops to 2.2. The pH is now adjusted to 7 by dropwise addition of 10% strength sodium hydroxide solution with the aid of a metering device controlled by a pH unit, and the mixture is stirred at 30°-35° C. for 5 hours. After 5 hours, only traces of the indolenine precursor and of the tribase precursor (1st methylation stage) can still be detected in a thin layer chromatogram. A total of 64 ml of 10% strength sodium hydroxide solution are added dropwise. The reaction mixture is now warmed to 90° C., whereupon the pH falls to 1.0. Chlorobenzene is distilled off with steam. The reaction volume is now 300 ml. The dyestuff is salted out with 1.5%, relative to the reaction volume, of sodium chloride at 90° C., the suspension of the dyestuff is allowed to cool by being subsequently stirred for several hours and the dyestuff is filtered off and washed with 50 ml of 5% strength sodium chloride solution.

Yield: 40.6 g of cationic hydrazone dyestuff, precursor content: 0.2%.

If the precursors obtained by coupling diazotised aniline, 4-toluidine, 2-toluidine, 2-anisidine, 3-chloro-4-anisidine or 4-phenetidine to 2,3,3-trimethylindolenine are used instead of the colour base employed in this example and the procedure is otherwise the same, valuable cationic hydrazone dyestuffs are likewise obtained.

EXAMPLE 5

33 g of the precursor obtained by coupling diazotised 4-anisidine to 2,3,3-trimethylindolenine in hydrochloric acid solution are stirred with 10 g of chlorobenzene, 75 g of water, in which 1 g of the addition product of 10 mols of ethylene oxide and 1 mol of nonylphenol has first been dissolved, and 5 g of magnesium oxide. The colour salt is thereby converted into the base. At pH 9.5, 44 g of dimethyl sulphate are added dropwise at 25° C., whilst cooling slightly; the pH is then 8.6. After stirring the mixture at 25° C. for 5 hours, the pH falls to 2.4. A further 1 g of magnesium oxide is added, the mixture is stirred at 25° C. for 1 hour (pH 8.4–7.8) and the pH is then adjusted to 2 with 10 ml of 10% strength hydrochloric acid. Chlorobenzene is distilled off with steam and the dyestuff is salted out with 3 g of sodium chloride. After subsequently stirring the mixture for several hours, the dyestuff is filtered off and washed with 200 ml of 5% strength sodium chloride solution. Yield: 35.9 g of cationic hydrazone dyestuff, precursor content: 0.2%.

If equimolar amounts of the colour salts obtained by coupling diazotised aniline, 4-toluidine or 4-phenetidine to 2,3,3-trimethyl-indolenine, 5-chloro-2,3,3-trimethyl-indolenine, 2,3,3,5-tetramethyl-indolenine or 5-methoxy-2,3,3-trimethylindolenine instead of the precursor hydrochloride used in this example and the procedure is otherwise the same, valuable cationic hydrazone dyestuffs are likewise obtained.

EXAMPLE 6

266 g of moist 4-anisole-azo-indolenine hydrochloride with a water content of 37.6%, ≙166.0 g of dry colour salt, are stirred with 250 ml of 1,2-dichloropropane at room temperature. 20 g of magnesium oxide are added, whereupon the temperature rises by 2°-3° C. The temperature of the mixture should then be 25°-27° C., so that subsequent methylation starts rapidly. 60 g of dimethyl sulphate are now allowed to run in and the mixture is left until the reaction starts, the suspended dyestuff hydrochloride dissolving. The reaction is kept at a temperature of 35°-40° C. by careful cooling with water, and a further 41 g of dimethyl sulphate are metered in at 35°-40° C. in the course of 30-60 minutes. When the addition has ended, the mixture is stirred for a further 60 minutes, the temperature being allowed to rise to 40° C. by reducing the cooling and stirring being continued at this temperature. The pH value is initially between 7.5 and 8.5 and, after the addition of dimethyl sulphate, it falls to 6.5–6.7 and then rises slowly again to 7.0. The stirrer is now switched off to separate the phases. The yellowish aqueous phase, which is slightly turbid as a result of undissolved magnesium oxide, rapidly settles at the bottom. The organic phase is dark red and clear. The aqueous phase is separated off and the dichloropropane phase, which contains water, remains in the reaction vessel.

8.5 g of magnesium oxide are now added and 79.5 g of dimethyl sulphate are allowed to run in at 30°-35° C. in the course of 30-60 minutes. The mixture is then subsequently stirred at 25°-30° C. for 8-10 hours and thereafter is heated carefully and uniformly to 60° C. in the course of 3 hours. According to a thin layer chromatogram, the precursor content in the finished methylated dyestuff is less than 0.1%. 250 g of water are now added and the mixture is subsequently stirred at 60°-65° C. for 30 minutes. The pH established should be 6.0–6.5. The pH value is brought to 3 by adding 10 g of 30% strength hydrochloric acid and the stirrer is then switched off to separate the phases. The dyestuff-containing dichloropropane phase settles at the bottom as a dark red clear liquid and is filtered off and evaporated in a thin film evaporator or in a vacuum paddle drier at a temperature of 60° C. and dried. 215 g of a cationic hydrazone dyestuff with a precursor content of less than 0.1% are obtained.

If corresponding indolenine colour salts obtained by coupling aniline, 4-toluidine, 2-toluidine, 2-anisidine, 4-phenetidine or 3-chloro-4-anisidine to 2,3,3-trimethyl-indolenine, 2,3,3,5-tetramethyl-indolenine, 2,3,3-trimethyl-5-methoxy-indolenine, 2,3,3-trimethyl-5-ethoxy-indolenine, 2,3,3-trimethyl-7-methoxyindolenine, 2,3,3-trimethyl-5-chloro-indolenine or 2,3,3-trimethyl-5-chloro-7-methoxy-indolenine are used instead of the 4-anisole-azo-indolenine hydrochloride and the procedure is otherwise the same, valuable cationic hydrazone dyestuffs are likewise obtained.

EXAMPLE 7

267 g of moist 4-anisole-azo-indolenine with a water content of 37.4%, ≙167 g of dry colour salt (purity, determined colorimetrically: 95% ≙159 g of pure colour salt) are stirred with 250 ml of 1,2-dichloropropane. 200 ml of 15.5% strength sodium carbonate solution are added dropwise at 50°–60° C. in the course of about 1 hour, so that a final pH value of 7 is achieved. The reaction mixture is filtered and the solution of the colour base in dichloropropan is separated off from the aqueous upper phase. 13 g of magnesium oxide are added to the organic phase and 134 g of dimethyl sulphate are then added dropwise at 40°–50° C., whilst cooling. The mixture is stirred for about 1 hour until crystals start to form, and 40 g of water are then added dropwise at 40°–50° C. in the course of 1 hour. The temperature is then kept at 40°–50° C. for a further 5 hours, the mixture is heated to 60° C. in the course of 1 hour and the temperature is kept at 60° C. for a further 60 minutes. According to a thin layer chromatogram, the precursor content in the finished methylated dyestuff is less than 0.1%. 100 ml of water are now added and the mixture is stirred at 60° C. for a further 15 minutes; the pH value established in the mixture is 6.0–6.5. The stirrer is switched off to separate the phases. The lower aqueous phase is separated off. After evaporation and drying of the organic phase at 60° C. in a vacuum paddle drier, 220 g of the cationic hydrazone dyestuff with a precursor content of less than 0.1% are obtained.

If equimolar amounts of corresponding indolenine colour salts which are obtained by coupling aniline, 4-toluidine, 2-anisidine or 3-chloro-4-anisidine to 2,3,3-trimethyl-indolenine, 2,3,3,5-tetramethyl-indolenine, 2,3,3-trimethyl-5-methoxy-indolenine, 2,3,3-trimethyl-5-ethoxy-indolenine, 2,3,3-trimethyl-7-methoxyindolenine, 2,3,3-trimethyl-5-chloro-indolenine or 2,3,3-trimethyl-5-chloro-7-methoxy-indolenine are used instead of the 4-anisole-azo-trimethylindolenine hydrochloride and the procedure is otherwise the same, valuable cationic hydrazone dyestuffs are likewise obtained.

We claim:

1. Process for the preparation of cationic hydrazone dyestuffs of the general formula

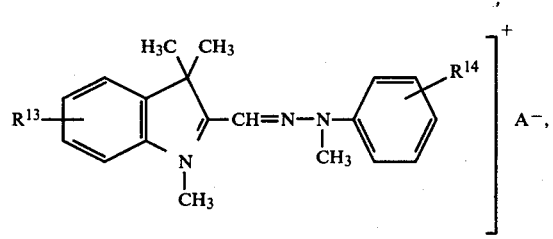

wherein $R^{13}$ and $R^{14}$ independently of one another represent hydrogen, $C_1$- to $C_4$-alkyl, $C_1$- to $C_4$-alkoxy or halogen, in particular chlorine or bromine, and
$A^-$ denotes an anionic radical,
by reacting azo bases of the general formula

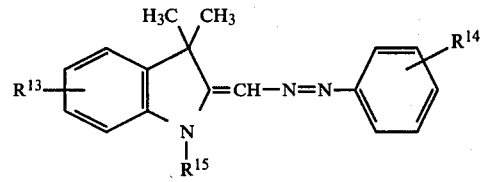

wherein
$R^{13}$ and $R^{14}$ have the abovementioned meaning and
$R^{15}$ represents hydrogen or the methyl group, with dimethyl sulphate in a mixture of water and an organic solvent and in the presence of an acid-binding agent, characterised in that (a) aromatic or aliphatic chlorinated hydrocarbons are used as the organic solvents, (b) the reaction is carried out at a temperature of 10°–60° C., (c) a 5–90% excess of dimethyl sulphate is employed and (d) the reaction is allowed to proceed at a pH of 5–10.

2. Process according to claim 1, characterised in that 1,2-dichloro-propane is used as the aliphatic chlorinated hydrocarbon.

3. Process according to claim 1, characterised in that sodium hydroxide in the form of a 5–10% strength solution is employed as the acid-binding agent, using a metering device controlled by the pH.

4. Process according to claim 1, characterised in that instead of the colour bases according to claim 1, salts thereof with inorganic or organic acids are employed, the colour base being liberated by the addition of acid-binding agents in the first reaction step.

5. Process according to claim 4, characterised in that the colour bases are liberated from the colour salts in a phase mixture of water and a chlorinated hydrocarbon.

6. Process according to claim 1, characterised in that the dyestuff is isolated by evaporating the entire reaction batch, with or without prior removal of the halogenated hydrocarbon.

7. Process according to claim 1, characterised in that the dyestuff according to claim 1 is taken up, in the form of the hydrate of the methosulphate, in a chlorinated hydrocarbon solvent, in particular 1,2-dichloro-propane, the solvent phase is separated off and the dyestuff is then isolated by evaporating off the solvent.

8. Process according to claim 1, characterised in that azo bases of the formula of claim 1, wherein $R^{15}$ represents hydrogen, are reacted with 1.3–1.9 mols of dimethyl sulphate at 10°–60° C. in a mixture of water and chlorinated hydrocarbon in a 1st reaction stage, the aqueous layer is separated off and the water-containing organic phase which remains is treated with 1.3–1.9 mols of dimethyl sulphate at 10°–60° C. in a 2nd reaction stage.

9. Process according to claim 8, characterised in that a mixture of chlorinated hydrocarbon and water containing 10–70 percent by weight of water is used for the 1st reaction stage and a mixture of chlorinated hydrocarbon and water containing 5–15 percent by weight of water is used in the 2nd reaction stage.

10. Process according to claim 1, characterised in that azo bases of the formula of claim 1 wherein $R^{15}$ represents hydrogen are reacted with 2.1–2.5 mols of dimethyl sulphate at 35°–60° C. in a chlorinated hydrocarbon, 5–10% of water being added to the reacting mixture after the addition of the dimethyl sulphate.

* * * * *